United States Patent
Marduel et al.

(10) Patent No.: US 10,800,119 B2
(45) Date of Patent: *Oct. 13, 2020

(54) METHOD FOR MANUFACTURING A NOISE REDUCING TREAD

(71) Applicant: COMPAGNIE GENERALE DES ETABLISSEMENTS MICHELIN, Clermont-Ferrand (FR)

(72) Inventors: Xavier Marduel, Tokyo (JP); Romain Calvel, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 186 days.

This patent is subject to a terminal disclaimer.

(21) Appl. No.: 15/764,728

(22) PCT Filed: Sep. 20, 2016

(86) PCT No.: PCT/JP2016/004285
§ 371 (c)(1),
(2) Date: Mar. 29, 2018

(87) PCT Pub. No.: WO2017/056456
PCT Pub. Date: Apr. 6, 2017

(65) Prior Publication Data
US 2018/0281327 A1    Oct. 4, 2018

(30) Foreign Application Priority Data

Sep. 30, 2015 (WO) .................. PCT/JP2015/078424

(51) Int. Cl.
*B29D 30/06* (2006.01)
*B29C 33/12* (2006.01)
(Continued)

(52) U.S. Cl.
CPC ........ *B29D 30/0606* (2013.01); *B29C 33/123* (2013.01); *B29C 35/02* (2013.01);
(Continued)

(58) Field of Classification Search
CPC ...... B29D 2030/061; B29D 2030/0614; B29D 2030/0616; B29D 30/66; B29D 2030/665;
(Continued)

(56) References Cited

U.S. PATENT DOCUMENTS 3,687,583 A    8/1972  Felker
6,143,223 A   11/2000  Lopez
(Continued)

FOREIGN PATENT DOCUMENTS

EP    0 858 875 A1    8/1998
EP    2 439 036 A1   11/2012
(Continued)

OTHER PUBLICATIONS

International Search Report issued in PCT/JP2015/078424 dated Jan. 12, 2016.
(Continued)

*Primary Examiner* — Xiao S Zhao
*Assistant Examiner* — John J Derusso
(74) *Attorney, Agent, or Firm* — Dickinson Wright PLLC; Steven Hurles

(57) ABSTRACT

A method for producing a tread for a tire having a plurality of contacting element delimited by a plurality of grooves and a connecting member. The method includes depositing at least one connecting member on a surface of an unvulcanized green tread, introducing the unvulcanized green tread with the connecting member into a mold having at least one molding element having a plurality of rib for forming the groove on the tread, at least two rib side faces and a molding surface, at least one rib having at least one notching
(Continued)

portion receiving a guiding member including a guiding slit, moving the connecting member to a predetermined position in the guiding slit through the guiding slit by green tread, molding and vulcanizing the green tread with the connecting member in the mold, and taking a molded and vulcanized tread out from the mold.

2 Claims, 7 Drawing Sheets

(51) Int. Cl.
| | | |
|---|---|---|
| *B29D 30/66* | (2006.01) | |
| *B29C 35/02* | (2006.01) | |
| *B60C 11/03* | (2006.01) | |
| *B60C 11/13* | (2006.01) | |

(52) U.S. Cl.
CPC .......... *B29D 30/66* (2013.01); *B60C 11/0309* (2013.01); *B60C 11/0327* (2013.01); *B60C 11/1369* (2013.01); *B29D 2030/061* (2013.01); *B29D 2030/0612* (2013.01); *B29D 2030/0616* (2013.01); *B29D 2030/665* (2013.01); *B60C 2011/0341* (2013.01); *B60C 2011/0362* (2013.01)

(58) Field of Classification Search
CPC ........ B29D 2030/0612; B29D 30/0606; B29D 2030/0613; B29C 33/123
See application file for complete search history.

(56) References Cited

U.S. PATENT DOCUMENTS

| | | | |
|---|---|---|---|
| 6,193,492 | B1 | 2/2001 | Lagnier et al. |
| 6,318,983 | B1 | 11/2001 | Lopez et al. |
| 7,276,198 | B2 * | 10/2007 | Nguyen .............. B29C 33/0033 |
| | | | 152/209.17 |
| 2008/0152744 | A1 | 6/2008 | Nguyen et al. |
| 2009/0218017 | A1 | 9/2009 | Delbet et al. |
| 2010/0092590 | A1 | 4/2010 | Ohara |
| 2018/0001715 | A1 | 1/2018 | Tezuka |

FOREIGN PATENT DOCUMENTS

| | | |
|---|---|---|
| JP | 10-225936 A | 8/1998 |
| JP | 2002-172623 A | 6/2002 |
| JP | 2002-331525 A | 11/2002 |
| JP | 2002-331526 A | 11/2002 |
| JP | 2002-361633 A | 12/2002 |
| KR | 10-2013-0078562 A | 7/2013 |
| WO | 2016/104662 A1 | 6/2016 |

OTHER PUBLICATIONS

International Search Report and Written Opinion issued in PCT/JP2016/004285 dated Dec. 6, 2016.

\* cited by examiner

METHOD FOR MANUFACTURING A NOISE REDUCING TREAD

CROSS-REFERENCE TO RELATED APPLICATIONS

This application is a 371 national phase entry of PCT/JP2016/004285, filed 20 Sep. 2016, which claims the benefit of International Patent Application No. PCT/JP2015/078424, filed 30 Sep. 2015.

BACKGROUND

In recent years, premiumisation and quality improvement of vehicles leads, from the view point of occupant's comfort and environmental considerations, desire to various noise reductions, in particular pass-by noise.

When a contacting element on a tread of a tire enters to or exits from a contact patch during rolling, the tread is forced to be bent due to flattening. At this stage, geometrical discontinuity caused by periodical contact of relatively axial grooves to the contact patch leads inhomogeneity of a bending stiffness of the tread in a circumferential direction and excites internal construction of the tire to generate noise.

In order to reduce such inhomogeneity of the bending stiffness of the tread in a circumferential direction, it is known that reduction of a volume of the axial groove is effective. However, it is also known that reduction of the volume of the axial groove penalizes hydroplaning performance of the tread. Thus, it is desired to improve noise performance while maintaining hydroplaning performance.

The applicants have proposed in FIG. 1 of an international patent application PCT/JP2015/086150, a pneumatic tire tread having a connecting member connecting a transverse face of a contacting element to a transverse face of a circumferentially adjacent contacting element and being made of a material having a higher Young modulus than a Young modulus of a contacting element to obtain satisfactory hydroplaning performance and satisfactory noise performance at the same time. In FIG. 6, is disclosed a pneumatic tire tread having a connecting member connecting a transverse face of a contacting element to a transverse face of circumferentially adjacent contacting element and extending continuously through two transverse faces of the same contacting element for improving productivity of such tread.

However, embedding such connecting member in the contacting element so as to connect two side faces of adjacent contacting elements across the groove requires complicated manufacturing process, thus improvement of productivity of such tread is still insufficient.

EP0858875A1 discloses, in FIG. 1, a mold having a first die and a second die functionally adapted to form at least one orifice allowing a rubber passing through the orifice during molding. However with such configuration, it is difficult to remove the first die or the second die which forms a bottom of a groove or an incision in particular in a form of a tire, thus a complicated process for removing such die is still required.

KR20130078562A discloses, in FIGS. 3 to 5, a method and a mold for manufacturing a pneumatic tire having a reinforced cord crossing a groove using a reinforced cord insertion block installed in a mold. However with such configuration, it is difficult to give a movement to the reinforced cord insertion block, necessary to place the reinforced cord into the reinforced cord insertion block thus a complicated process is still required, and moreover difficult to prevent rubber from flashing into the groove.

US20080152744A1 discloses, in FIG. 1, a molding element suitable for molding sunken grooves or sipes in a tread, and such device may be comprised of a thin flexible wire. However, with such molding element it is difficult to place a connecting member as to connect side faces of different contacting elements as the thin flexible wire is pulled out from the tread.

A "tire" means all types of elastic tire whether or not subjected to an internal pressure.

A "green tire" means a superposition of a plurality of semi-finished rubber products present in the form of strips or sheets, with or without reinforcement. The green tire is intended to be vulcanized in a mold in order to obtain the tire.

A "green tread" means a semi-finished rubber product intended to be vulcanized in a mold in order to obtain the tread. The green tread may be one of semi-finished rubber product constituting the green tire.

A "tread" of a tire means a quantity of rubber material bounded by lateral surfaces and by two main surfaces one of which is intended to come into contact with ground when the tire is rolling.

A "mold" means a collection of separate molding elements which, when brought closer towards one another, delimit a toroidal molding space.

A "molding element" of a mold means part of a mold. A molding element is, for example, a mold segment.

A "molding surface" of a molding element means a surface of the mold that is intended to mold a surface of the tread.

A "modulus at 10% elongation" is a tensile stress (in MPa) at ten percent (10%) elongation measured according to ASTM standard D412.

A "groove" is a space between two rubber faces/sidewalls which do not contact between themselves under usual rolling condition connected by another rubber face/bottom. A groove has a width and a depth.

It is thus an object of the disclosure to provide a method for manufacturing a tread for a tire, such method can improve productivity for manufacturing a tread provided with a connecting member connecting two side faces of adjacent contacting elements.

SUMMARY

The present disclosure provide a method for producing a tread for a tire having a plurality of contacting element delimited by a plurality of grooves and a connecting member intended to connect two side faces of adjacent contacting elements, the method comprises at least the steps of depositing at least one connecting member on a surface of an unvulcanized green tread, introducing the unvulcanized green tread with the connecting member into a mold having at least one molding element having a plurality of rib for forming the groove on the tread, at least two rib side faces for forming frontal side faces and/or lateral side faces of the contacting element and a molding surface for forming a contact face of the contacting element intended to come into contact with ground during rolling, at least one rib having at least one notching portion receiving a guiding member which has two opposite side faces configured to form a part of the side faces of the contacting element and a top face configured to form a bottom of the groove and is made of a material different from a material constituting the molding element whose modulus at 10% elongation being lower than that of the molding element, the guiding member comprising a guiding slit extending from one of the two opposite side faces to the other of the two opposite side faces through the guiding member and opening to the top face and extending radially toward the molding surface so as to receive the connecting member, moving the connecting member to a predetermined position in the guiding slit through the guiding slit by green tread, molding and vulcanizing the green tread with the connecting member in the mold, and taking a molded and vulcanized tread out from the mold.

This arrangement improves productivity for manufacturing a tread provided with a connecting member connecting two side faces of adjacent contacting elements.

Since at least one connecting member on a surface of unvulcanized green tread can easily deposited or placed manually or automatically using a process similar to put semi-finished material circumferentially, thus it is possible to prepare efficiently the unvulcanized green tread with the connecting member.

Since the guiding slit extends from one of the opposite two side faces to the other of the opposite two side faces through the guiding member and opens to the top face and extends radially, the guiding slit can receive the connecting member to be positioned at a predetermined position during molding, and release the connecting member from the mold during demolding without any complicated process. As a result, productivity for manufacturing the tread provided with the connecting member can be improved.

Since material constituting the guiding member has lower modulus at 10% elongation than that of the molding element, it is possible to let the connecting member enter to/exit from the guiding slit. Once the connecting member has passed, the guiding slit is substantially closed for preventing rubber from flashing into the guiding slit during molding which would prevent rubber from flashing into the groove after demolding.

Since the guiding member made of the material different from the material constituting the molding element is received in the notching portion, it is possible to maintain a form of the side faces of the contacting element. As a result hydroplaning performance further be maintained. At the same time, since the guiding member which exposed to stresses from the connecting member is constructed as a separate and replaceable member in the molding element, maintenance of the molding element can be easier.

In another advantageous embodiment, the connecting member is in a form of cable, wire or strings.

According to this arrangement, it is possible to efficiently prepare the green tread provided with the connecting member in particular with a green tire by simply wrapping the connecting member around the green tire. As a result, productivity can further be improved.

In another advantageous embodiment, the material constituting the guiding member is an elastomeric composition.

According to this arrangement, penetration of rubber into the guiding slit during molding would further effectively be inhibited, thus rubber flashing in the groove after demolding will further be prevented.

BRIEF DESCRIPTION OF DRAWINGS

Other characteristics and advantages of the disclosure arise from the description made hereafter in reference to the annexed drawings which show, as nonrestrictive examples, the embodiments of the disclosure.

DETAILED DESCRIPTION

Figure 1:
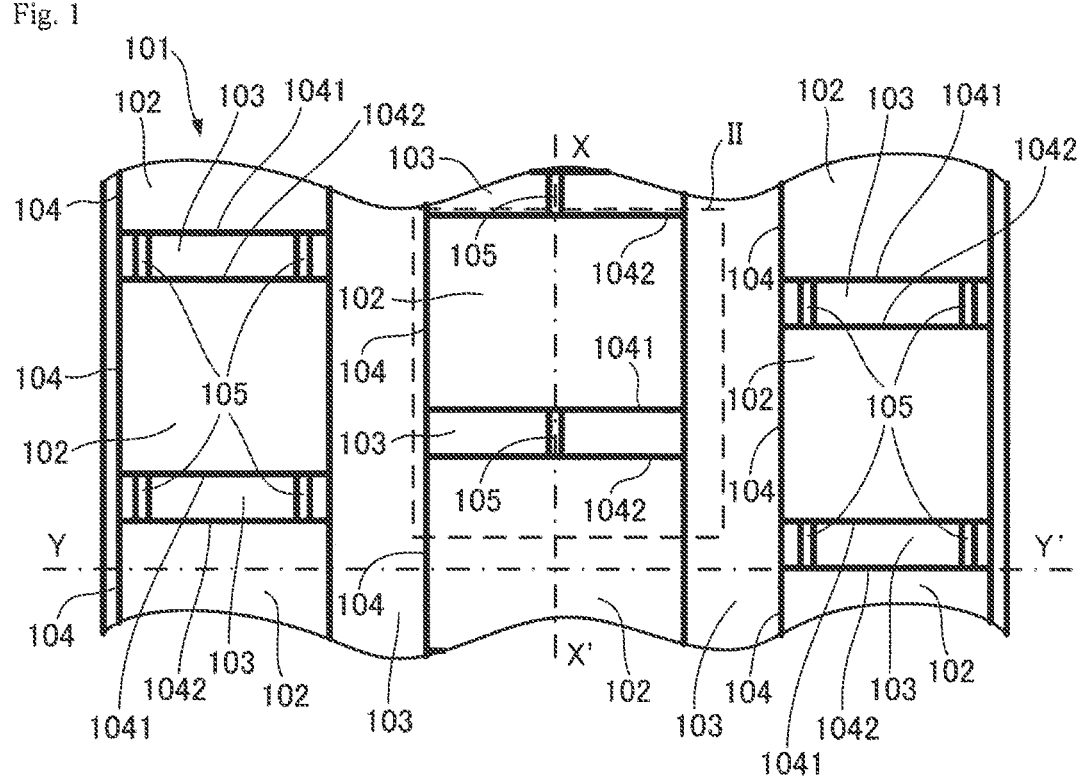
FIG. 1 is a schematic plan view of a tread for a tire manufactured in a method according to embodiment of the present disclosure.

Preferred embodiment of the present disclosure will be described below referring to the drawings.

A molding element 1 for a mold used for manufacturing a tread 101 of a tire, a mold comprising the molding element 1, and a tread 101 molded and vulcanized in a method for manufacturing a tread according to an embodiment of the present disclosure, will be described referring to FIGS. 1 to 8.

Figure 2:
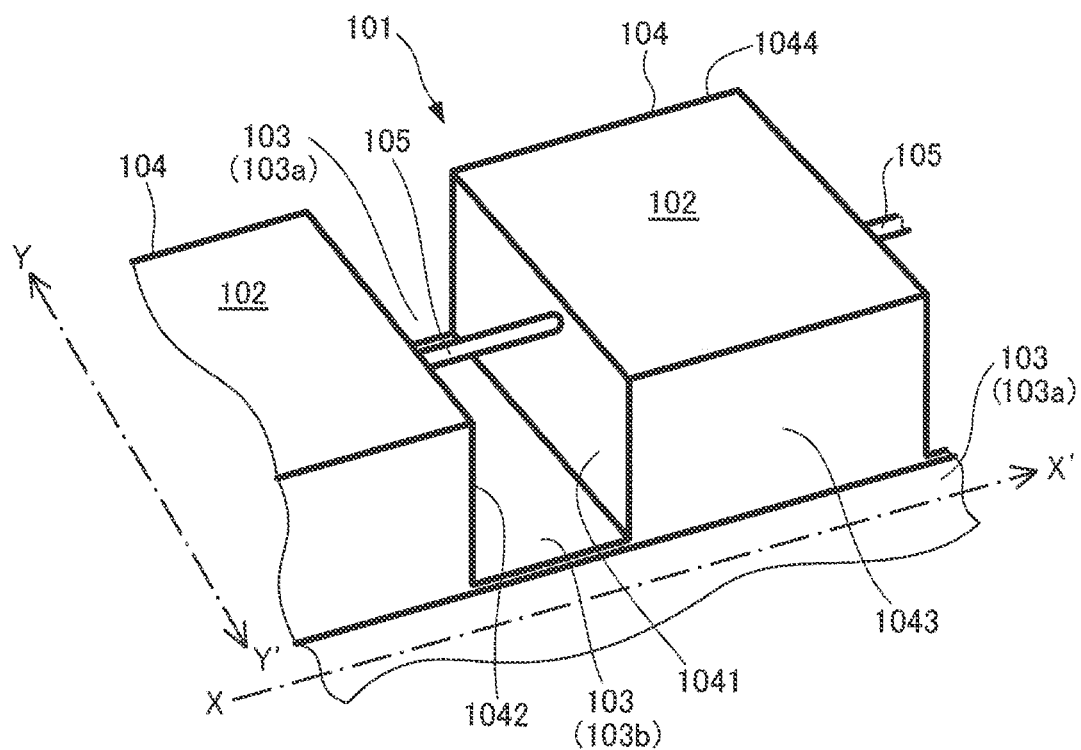
FIG. 2 is an enlarged schematic perspective view showing a portion indicated as II in FIG. 1.
Figure 3:
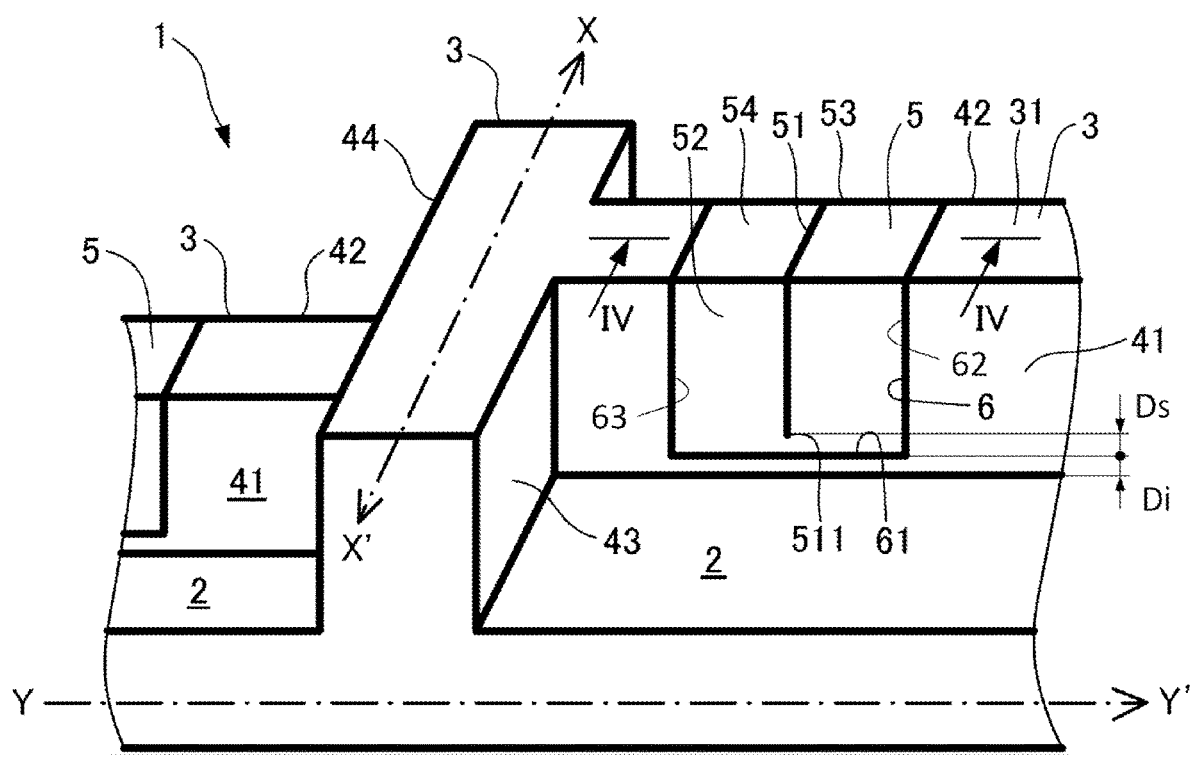
FIG. 3 is a schematic perspective view of a portion of a molding element with a guiding member using a method according to the embodiment of the present disclosure.

FIG. 1 is a schematic plan view of a tread for a tire manufactured in a method according to an embodiment of the present disclosure. FIG. 2 is an enlarged schematic perspective view showing a portion indicated as II in FIG. 1. FIG. 3 is a schematic perspective view of a portion of a molding element with a guiding member using a method according to the embodiment of the present disclosure. FIGS. 4 to 7 are schematic cross sectional views taken along line IV-IV in FIG. 3 and a green tread with a connecting member at one step of a method using the molding element in FIG. 3. FIG. 8 is a schematic cross sectional view of the molding element taken along line IV-IV in FIG. 3 and a tread for a tire with a connecting member at one step of a method using the molding element in FIG. 3.

The tread 101 is a tread for a tire having dimension 205/55R16 and comprises a plurality of two circumferential grooves 103a extending in a tire circumferential direction indicated as XX' and axial grooves 103b extending in a generally tire axial direction indicated as YY'.

As shown in FIG. 1, a plurality of contacting elements 104 having generally rectangular parallelepiped shaped is formed in the tread 101. The contacting element 104 is delimited by the circumferential grooves 103a in a circumferential direction and is delimited by axial grooves 103b in an axial direction. Thus, the contacting element 104 has two transverse surfaces (frontal faces) 1041, 1042 facing to circumferentially opposite directions.

Adjacently arranged contacting elements 104 in a circumferential direction are separated by the axial groove 103b. The contacting element 104 has a contact face 102 intended to come into contact with ground during rolling at a top portion thereof.

The tread 101 has the same structure as the conventional tread except for an arrangement regarding the connecting member 105 and is intended to be applied to a conventional pneumatic radial tire. Thus, description of the internal construction of the tread 101 will be omitted.

Between two circumferentially adjacent contacting elements 104, a connecting member 105 having a thin rod-like shape is provided. The connecting member 105 extends across the axial groove 103b between two circumferentially adjacent contacting elements 104, as shown in FIGS. 1 and 2.

In the present embodiment, one connecting member 105 is provided between circumferentially adjacent contacting elements 104 in axially central region in the tread 101. That is, in axially central area, circumferentially adjacent contacting elements 104 are connected by one connecting member 105.

On the other hand, two connecting members 105 are provided between circumferentially adjacent contacting elements 104 in axially outward regions in the tread 101. That is, in axially outward areas, circumferentially adjacent contacting elements 104 are connected by two connecting members 105. Two connecting members 105 are positioned at the same radial position.

In the present embodiment, the connecting members 105 are arranged so as to extend substantially along the circumferential direction maintaining the same distance from the rotation axis of the tire. That is, the connecting members 105 extend in parallel to the contact face 102.

Each connecting member 105 extends along the circumferential groove 103a, thus an angle of an extending direction of the connecting member 105 relative to the tire circumferential direction is 0 degree.

In the arrangement of the embodiment, inhomogeneity of the bending stiffness of the tread 101 in circumferential direction can be drastically decreased, which results less excitation of internal construction of the tire. Thus, noise generated during rolling of the tire can be reduced.

Next, a molding element 1 for a mold used for manufacturing the tread 101 will be described referring to FIG. 3.

As shown in FIG. 3, the molding element 1 has a molding surface 2 intended to mold the contact face 102 of the contacting element 104. The molding element 1 also has a plurality of ribs 3 intended to mold the groove 103a, 103b as to radially outwardly extend from the molding surface 2.

The rib includes a rib top face 31 intended to mold a bottom of the groove 103a, 103b. A radial position of the rib top face 31 can be the same among the ribs 3, or can be different among the ribs 3.

The ribs 3 intended to mold the axial groove 103b also includes circumferentially opposing rib side faces 41, 42 intended to mold the frontal faces 1041, 1042 of the contacting element 104. The rib 3 intended to mold the axial groove 103b includes a notching portion 6. The notching portion 6 is formed by removing a part of the rib 3 and has generally rectangular parallelepiped shape defined by bottom face 61 and axially opposing side faces 62, 63.

The notching portion 6 receives therein a guiding member 5 having a top face 54 and circumferentially opposed two side faces 52, 53 and complementary to the notching portion 6. An internal space of the notching portion 6 is filled with the guiding member 5 such that the top face 54 is flush with the rib top face 31 and the side faces 52, 53 are flush with the rib side faces 41, 42 of the rib 3, respectively. Thus, the side faces 52, 53 of the guiding member 5 are to form a part of the frontal side faces 1041, 1042 of the contacting element 104.

The material constituting the guiding member 5 has a modulus at 10% elongation lower than that of the molding element. The material of the guiding member 5 is preferably an elastomeric composition. An example of the elastomeric composition is, for example saturated or unsaturated rubbers and thermoplastic elastomers.

The guiding member 5 has a guiding slit 51 extending circumferentially through the guiding member 5 and radially inwardly from the top face 54. That is, the guiding slit 51 extends from one of the opposite two side faces 52, 53 to the other of the opposite two side faces 52, 53 through the guiding member 5 and is open to the side faces 52, 53 and the top face 54 of the guiding member 5.

As shown in FIG. 3, radially outward end of the guiding slit 51 opens at an axially central position on the top face 54 of the guiding member 5. The guiding slit 51 terminates at a closed end 511 near the bottom face 61 of the notching portion 6. A radial distance Ds between the closed end 511 of the guiding slit 51 and the bottom face 61 of the notching portion 6, is more than or equal to 1.0 mm. A radial distance Di between the molding surface 2 and the bottom face 61 of the notching portion 6 will define a position of the connecting member 105 after demolding together with the radial distance Ds between the closed end 511 of the guiding slit 51 and the bottom face 61 of the notching portion 6.

Although the guiding slit 51 extends radially in the present embodiment, the guiding slit may extend with an angle relative to radial orientation for better demolding of the connecting member 105 for example in a region where an orientation perpendicular to the molding surface 2 differs from radial orientation of the molding element 1. The guiding slit 51 may extend along slightly curved path in radial orientation and/or in circumferential orientation.

A manufacturing of a tread 101 of a tire using the above molding element will be described referring to FIGS. 4 to 8.

Figure 4:
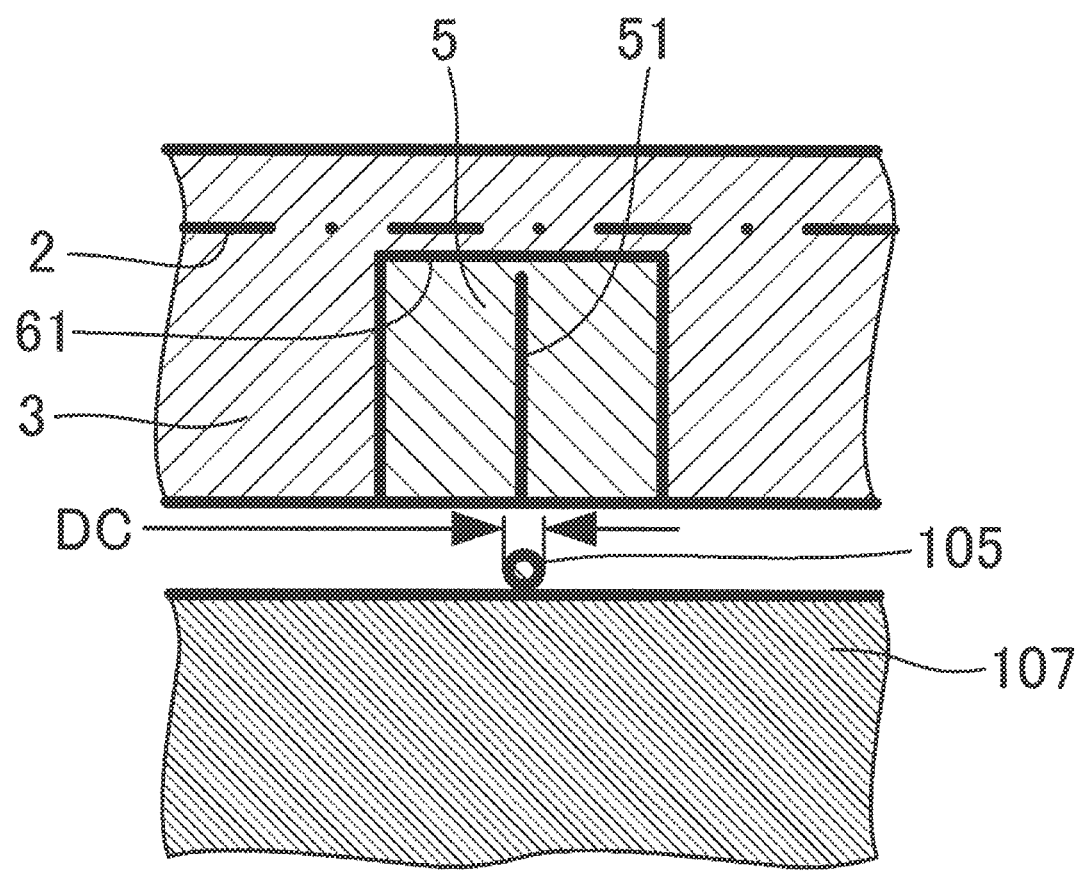
FIG. 4 is a schematic cross sectional view of the molding element taken along line IV-IV in FIG. 3 and a green tread with a connecting member at one step of a method using the molding element in FIG. 3.

As shown in FIG. 4, as a first step, at least one connecting member 105 having diameter DC is circumferentially disposed on a surface of an unvulcanized green tread 107. The unvulcanized green tread 107 with the connecting member 105 is placed in a mold having at least one molding element 1 described above.

The connecting member 105 is an elongated member such as cable, wire or strings. The connecting member 105 may be put on the surface of unvulcanized green tread 107, partially or completely, manually or automatically using a process similar to put semi-finished material circumferentially. The connecting member 105 may be sticked onto the surface of unvulcanized green tread 107 with a help of, for example an adhesive or another unvulcanized rubber.

Figure 5:
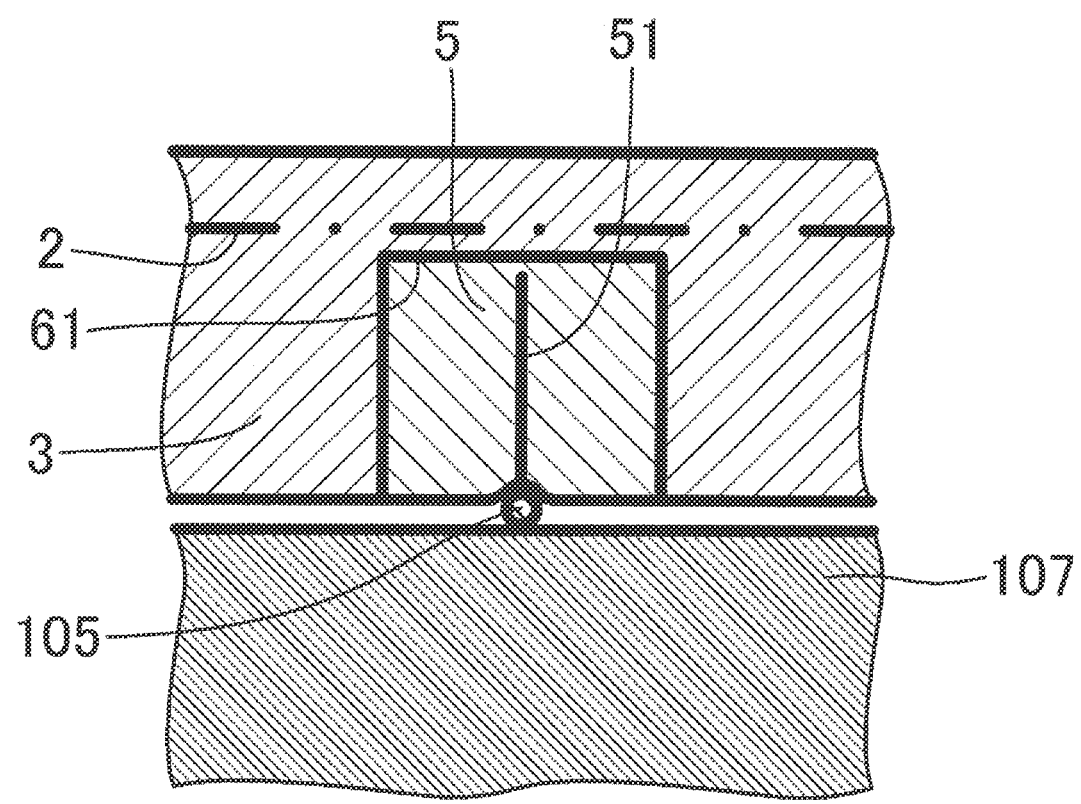
FIG. 5 is a schematic cross sectional view of the molding element taken along line IV-IV in FIG. 3 and a green tread with a connecting member at one step of a method using the molding element in FIG. 3.

Then, as shown in FIG. 5, as the unvulcanized green tread 107 is moved toward the mold element 1, the connecting member 105 on the surface of the unvulcanized green tread 107 is in contact with an upper end of the guiding slit 51 and then, forcibly opens the upper end of the guiding slit 51.

Figure 6:
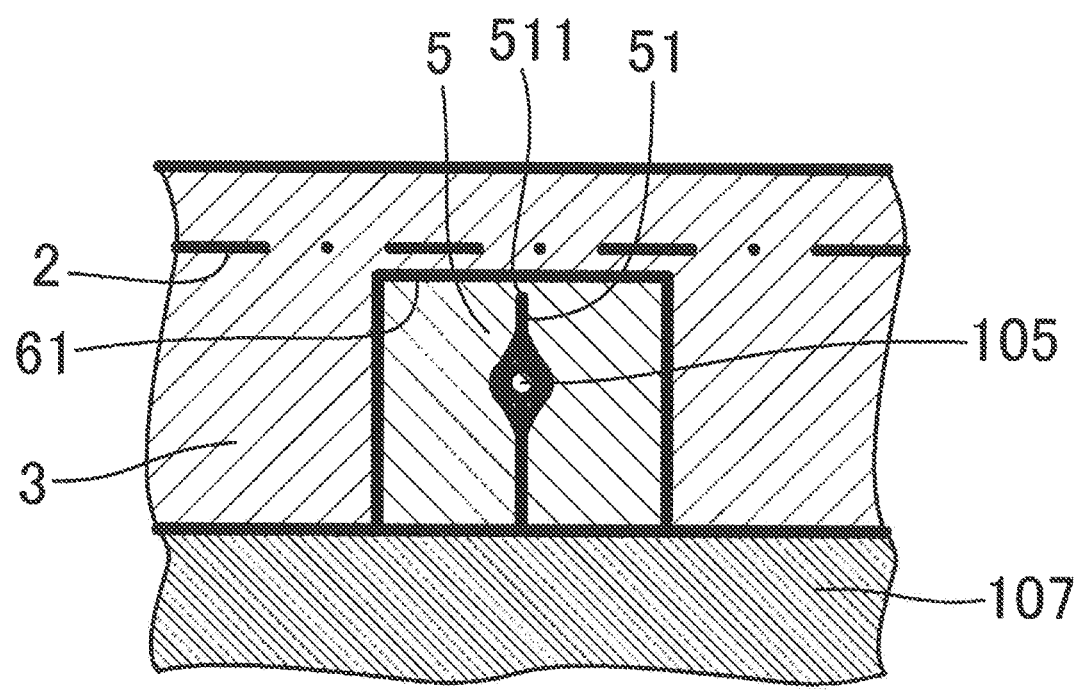
FIG. 6 is a schematic cross sectional view of the molding element taken along line IV-IV in FIG. 3 and a green tread with a connecting member at one step of a method using the molding element in FIG. 3.

Then, the connecting member 51 is continuously pushed downwardly by portions of the green tread 107 located in circumferentially both sides of the rib 3 and penetrated into and moved downwardly toward the closed end 511 along the guiding slit 51 as shown in FIG. 6, deforming the guiding member 5 outwardly in a width direction. Once the connecting member 51 has passed, the guiding slit 51 is closed again.

Figure 7:
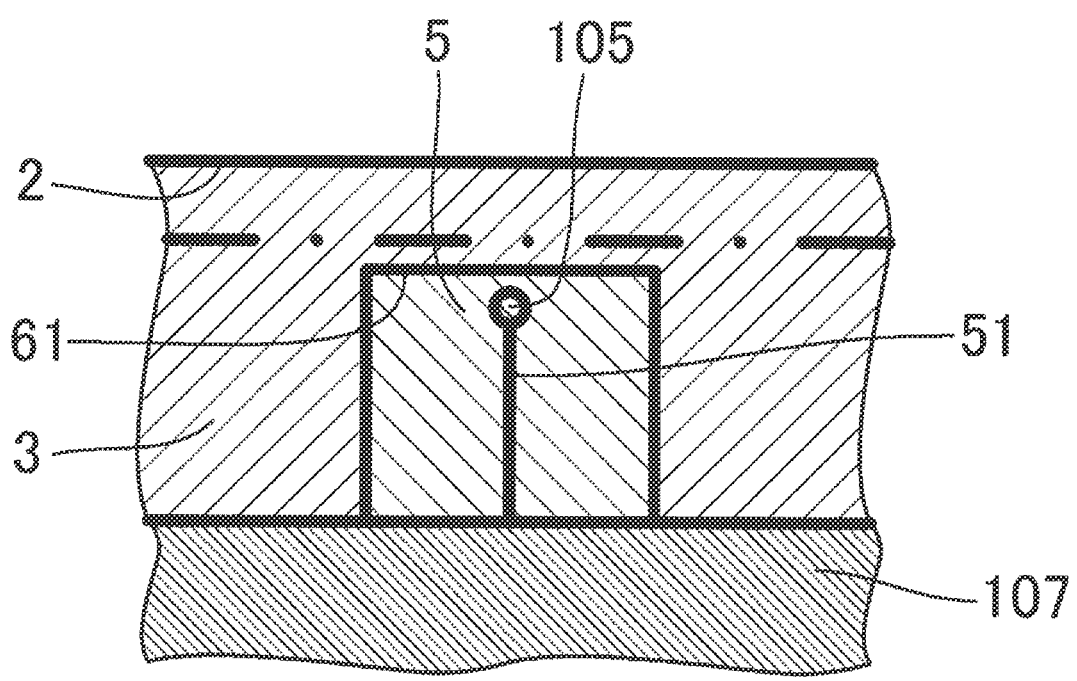
FIG. 7 is a schematic cross sectional view of the molding element taken along line IV-IV in FIG. 3 and a green tread with a connecting member at one step of a method using the molding element in FIG. 3.
Figure 8:
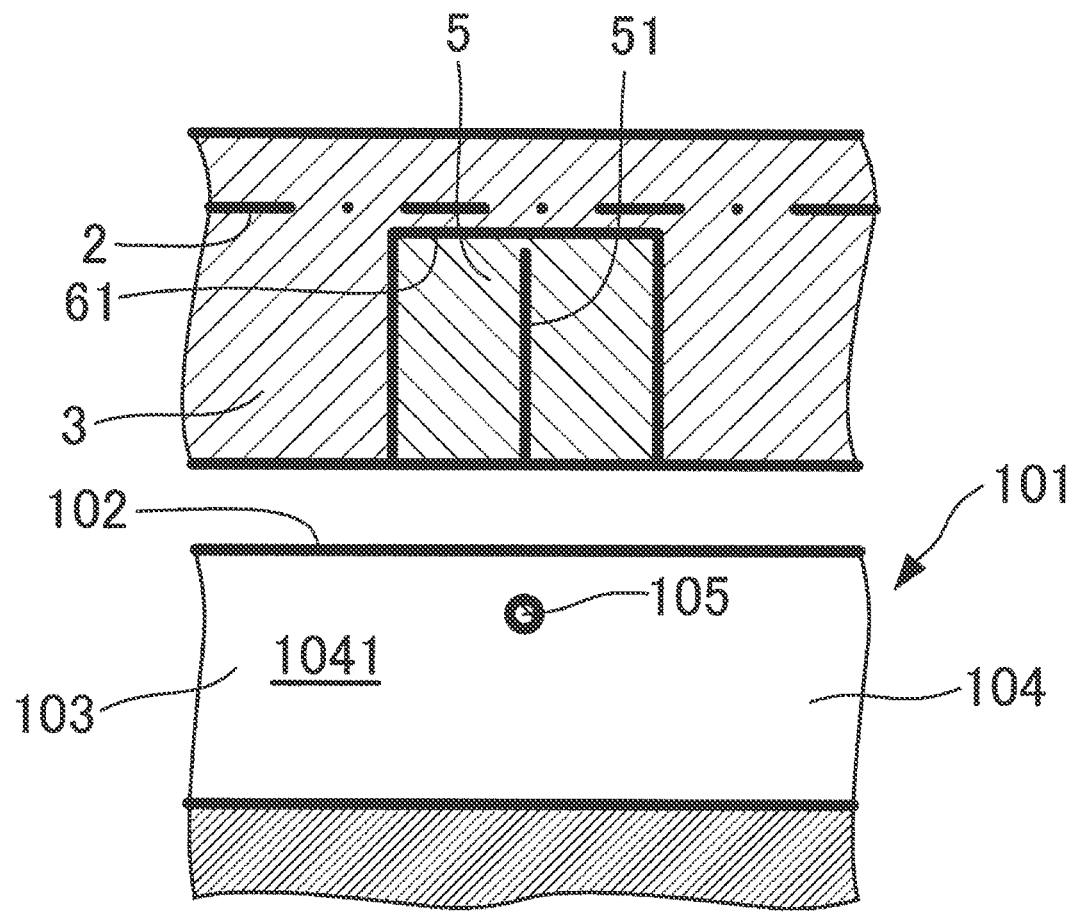
FIG. 8 is a schematic cross sectional view of the molding element taken along line IV-IV in FIG. 3 and a tread for a tire with a connecting member at one step of a method using the molding element in FIG. 3.

Once the connecting member 105 reaches the closed end 511 of the guiding slit 51 as shown in FIG. 7, the connecting member 105 cannot be further moved and stop at the closed end 511. On the other hand, the portions of the green tread 107 located in circumferentially both sides of the rib 3 further continuously downwardly moves toward the molding surface 2 of the molding element 1. Since the guiding slit 51 is closed behind the connecting member 105, the rubber does not enter into the guiding slit 51.

Once the portion of the green tread 107 located in circumferentially both sides of the rib 3 reach the molding surface 2 of the molding element 1, the portions of the green tread 107 stop moving and the mold is closed.

Then, heat and pressure is applied for vulcanizing and molding the green tread 107. During this process, the green tread 107 is turned to the tread 101 to which the connecting member 105 is fixedly attached so as to connect two frontal faces 1041, 1042 of the adjacent contacting elements 104. Specifically, a part of the connecting member 105 is exposed in the axial groove 103b and remaining part of the connecting member 105 is embedded in the contacting elements 104.

After completion of vulcanization and molding, the mold is opened as shown in FIG. 8. During demolding, the part of the connecting member 105 exposed in the axial groove 103b is escaped from the guiding member 5 passing through the guiding slit 51.

With the method using the molding element 1, it is possible to manufacture a tread 101 of a tire having a plurality of contacting elements 104 delimited by a plurality of grooves 103 and a connecting member 105 connecting two side faces 1041, 1042, 1043, 1044 of adjacent contacting elements 104 without complicated process, and thus it is possible to improve productivity for manufacturing such tread 101.

Since the guiding slit 51 opens to the two side faces 52, 53 and the top face 54 of the guiding member 5 and extending radially, it is possible to position the connecting member 105 at a predetermined position in the contacting element 104 and to leave the connecting member 105 there without any complicated process.

Since the material constituting the guiding member 5 has lower modulus at 10% elongation than that of the molding element 1, it is possible to let the connecting member 105 easily enter to/exit from the guiding slit 51. Further, once the connecting member 105 has passed, the guiding slit 51 is closed, the rubber does not flash into the guiding slit 51 during molding.

Since the notching portion 6 is filled with the guiding member 5 made of the material different from the material constituting the molding element 1, it is possible to maintain a form of the side faces 1041, 1042, 1043, 1044 of the contacting element 104. As a result hydroplaning performance can be maintained.

Since the guiding member 5 is a separate and replaceable member, maintenance of the molding element 1 can be easier.

Since the elastomeric composition constituting the guiding member 5 is different from the material constituting the molding element 1, it is possible to prevent rubber from being penetrated into the guiding slit 51 during molding.

Since the guiding slit 51 does not open to the bottom face 61 thanks to the closed end 511, the connecting member 105 does not enter into a space between the guiding member 5 and a bottom face 61 of notching portion 6.

Alternatively, the notching portion 6 is filled with the guiding member 5 may be made of a liquid elastomeric composition which will have necessary characteristics described above after certain period of duration after being filled into the notching portion 6.

The disclosure is not limited to the examples described and represented and various modifications can be made there without leaving its framework.

The invention claimed is:

1. A method for producing a tread for a tire having a plurality of contacting elements delimited by a plurality of grooves and a connecting member that connects two side faces of adjacent contacting elements, comprising:
    (a) depositing the connecting member on a surface of an unvulcanized green tread, the connecting member being in the form of cable, wire or strings,
    (b) introducing the unvulcanized green tread with the connecting member into a mold having at least one molding element having a plurality of ribs for forming the grooves on the tread, at least two rib side faces for forming frontal side faces and/or lateral side faces of at least one of the plurality of the contacting elements and a molding surface for forming a contact face of the plurality of the contacting elements, at least one rib having at least one notching portion receiving a guiding member which has two opposite side faces shaped to form a part of the side faces of the plurality of the contacting elements and a top face shaped to form a bottom of the groove, being made of a material different from a material constituting the molding element whose modulus at 10% elongation being lower than that of the molding element, the guiding member comprising a guiding slit extending from one of the two opposite side faces to the other of the two opposite side faces through the guiding member and opening to the top face and extending radially toward the molding surface so as to receive the connecting member,
    (c) moving the connecting member to a predetermined position in the guiding slit through the guiding slit by the unvulcanized green tread,
    (d) molding and vulcanizing the unvulcanized green tread with the connecting member in the mold, and
    (e) taking a molded and vulcanized tread out from the mold.

2. The method according to claim 1, wherein the material constituting the guiding member is an elastomeric composition.

* * * * *